No. 679,234. Patented July 23, 1901.
W. W. LIND & J. C. McKEE.
PROCESS OF REMOVING AND SEPARATING BRAN FROM GRAIN.
(Application filed Oct. 30, 1900.)
(No Model.) 4 Sheets—Sheet 3.
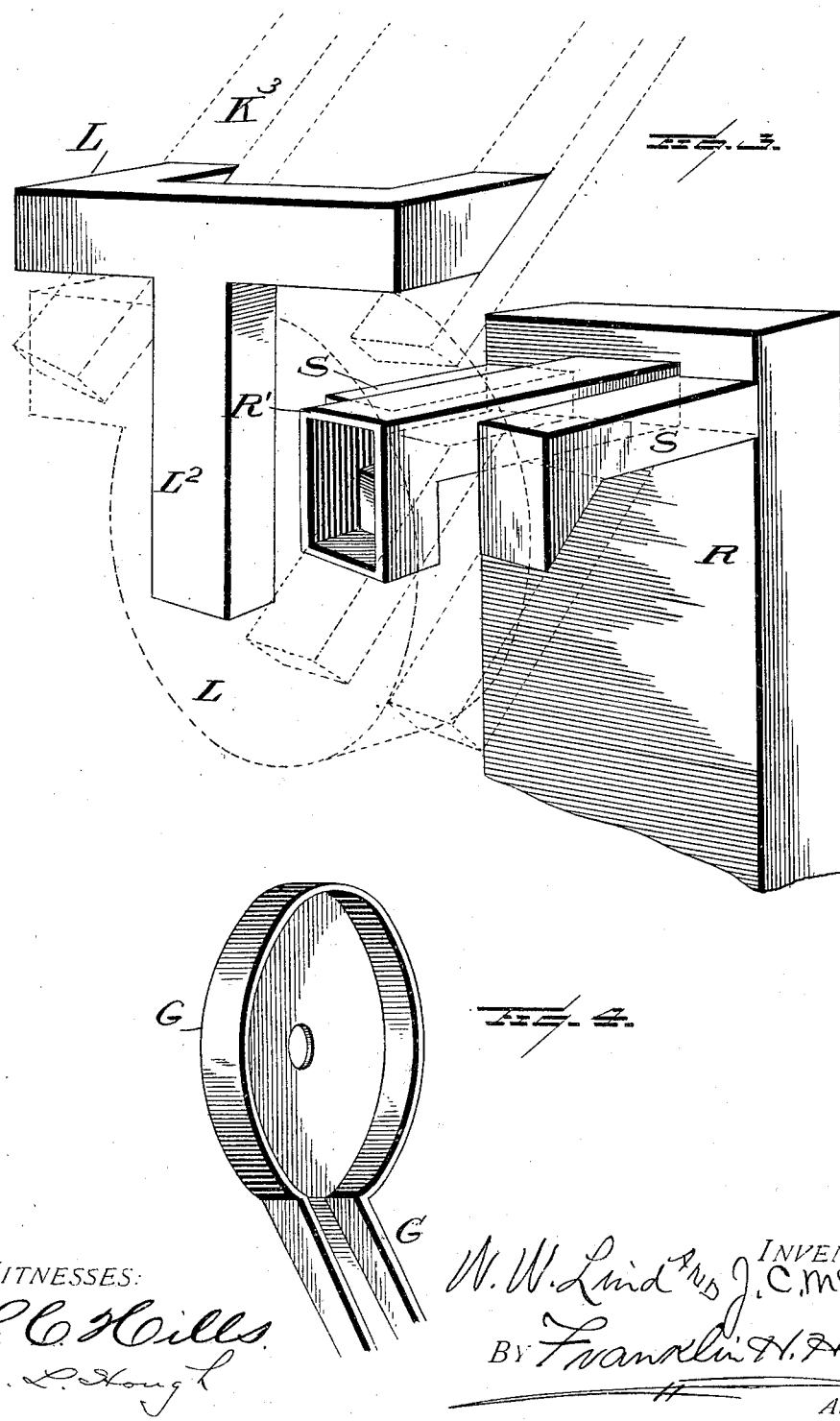

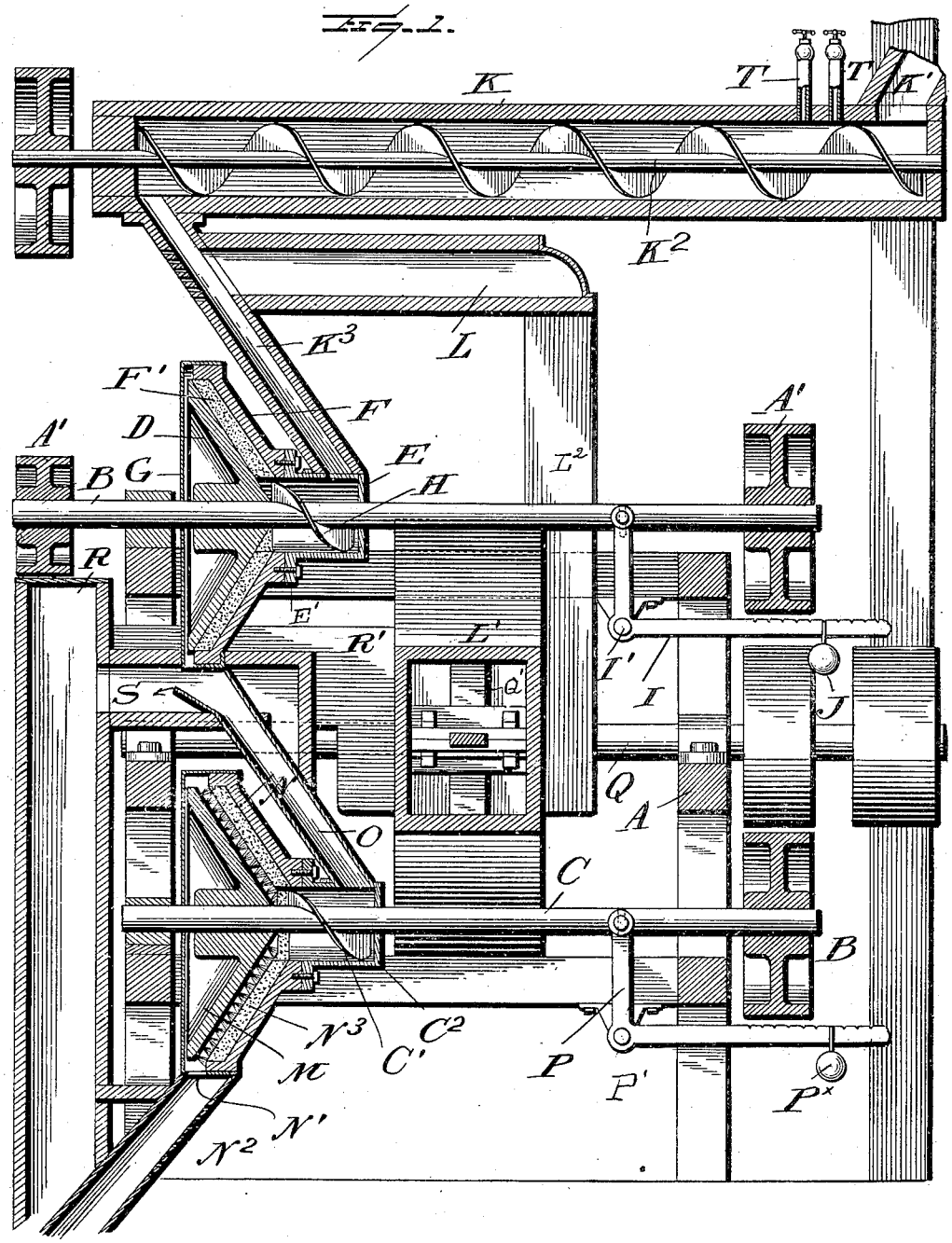

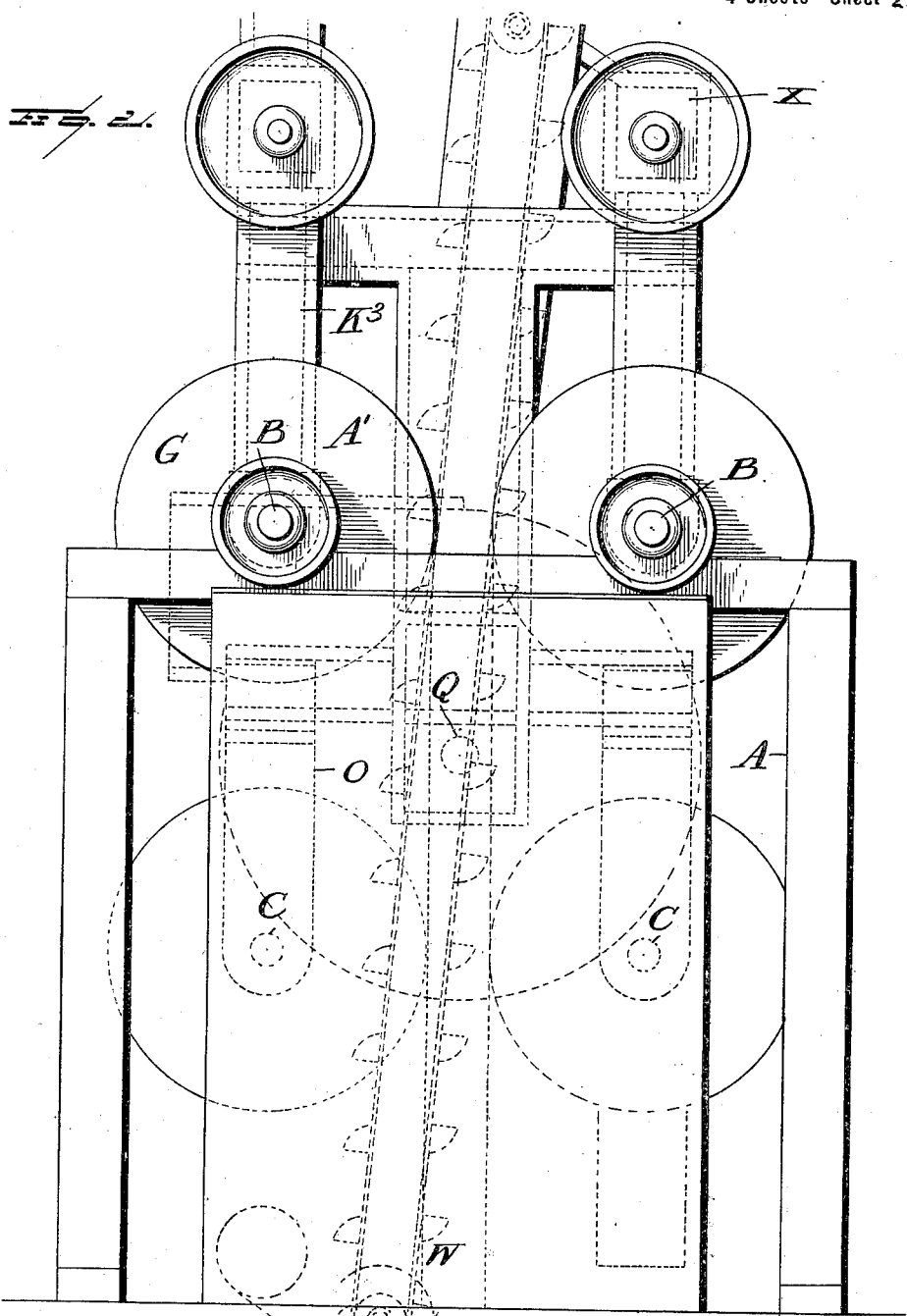

No. 679,234. Patented July 23, 1901.
W. W. LIND & J. C. McKEE.
PROCESS OF REMOVING AND SEPARATING BRAN FROM GRAIN.
(Application filed Oct. 30, 1900.)
(No Model.) 4 Sheets—Sheet 4.
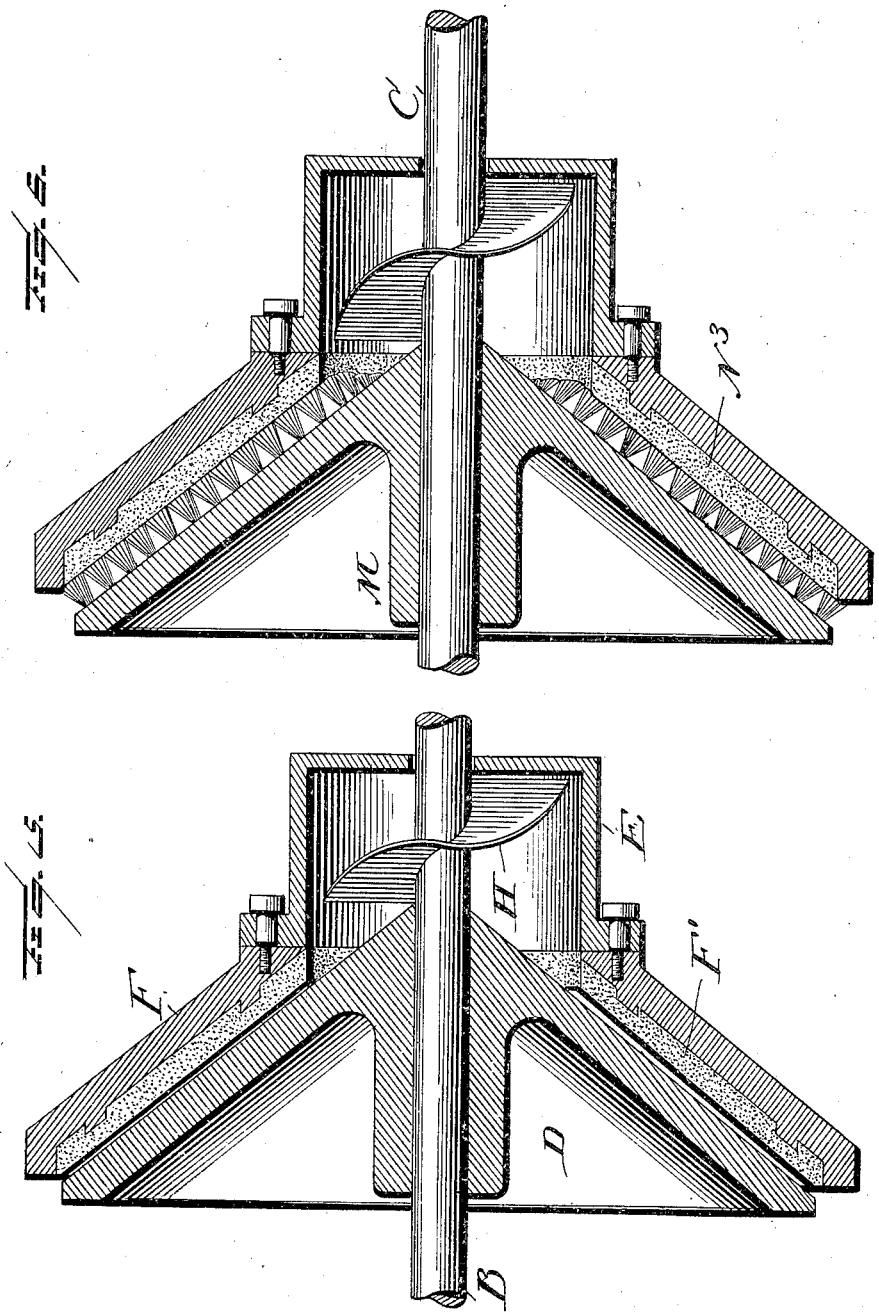

UNITED STATES PATENT OFFICE.

WILLIARD W. LIND AND JOSEPH C. McKEE, OF CALDWELL, IDAHO.

PROCESS OF REMOVING AND SEPARATING BRAN FROM GRAIN.

SPECIFICATION forming part of Letters Patent No. 679,234, dated July 23, 1901.

Application filed October 30, 1900. Serial No. 34,945. (No specimens.)

*To all whom it may concern:*

Be it known that we, WILLIARD W. LIND and JOSEPH C. MCKEE, citizens of the United States, residing at Caldwell, in the county of Canyon and State of Idaho, have invented certain new and useful Improvements in Processes of Removing and Separating Bran from Grain; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in processes for treating cereals, and pertains more particularly to that art in which the cereals are treated to remove the bran or woody matter before the material is finally treated for reduction into the kind of produce required. It has for its main object to insure a thorough removal of bran or woody matter, which when ground with the whole grain assumes a fuzzy and feathery nature, which causes the fine particles of glutinous matter composing the inner portions of the kernels to adhere thereto, so that said fine particles necessarily go with the lower grade of stock. By our process we save these particles, hence materially increase the output or quantity of the high-grade stock. We so treat the grain as to remove the outer scale, then remove all of the same, and then treat the grain so that all the particles of bran that may adhere to the second or inner bran-scale are removed. We then loosen and remove the second bran-scale and subsequently release all of the particles thereof that may adhere to the kernels, so that the latter are absolutely free from all adhering bran before they are finally treated for reduction into the required kind of produce, and by our process the bran-scales alone are removed and all of the glutinous matter is saved. We attach importance to the thorough removal of each of the bran-scales by itself—that is, each independent of the other—for the reason that when an attempt is made to remove both the inner and outer bran-scales by one treatment or by successive treatments which do not severally remove completely first the outer scale and then the inner scale more or less of the fine particles of glutinous matter are removed therewith, which by our mode of treatment is entirely saved.

The invention will be hereinafter more fully described and then specifically defined in the appended claim.

The invention is clearly illustrated in the accompanying drawings, which, with the letters of reference marked thereon, form part of this application, and in which drawings similar letters of reference indicate like parts throughout the several views, in which—

Figure 1 is a vertical sectional view through our improved apparatus for removing the bran from grain. Fig. 2 is an end elevation, portions of the machine being shown in dotted lines. Fig. 3 is a perspective view of a portion of the apparatus, showing the fan-box and flues. Fig. 4 is a detail in perspective of a combined casing and spout for one of the sets of bran-removing wheels. Fig. 5 is an enlarged vertical sectional view of one set of bran-removing wheels; and Fig. 6 is a similar view through the second set of wheels, in which one of the contact-surfaces is provided with brushes and the other with a semisolid material or felt.

Reference now being had to the details of the drawings by letter, A designates the frame of the apparatus, and B B and C C are shafts mounted in suitable bearings in said frame and provided with driving-pulleys A' and B'. The upper shafts B B each has a conical-shaped disk or wheel D rotating therewith, made preferably of metal, and held stationary to the frame is a feed-box E, to the flanges E' of which is secured a concave member F, to the inner concaved face of which is secured a semisolid material F', preferably of felt, and G is a circular casing having an integral trough G', Fig. 4, through which the grain passes after the bran has been loosened and freed therefrom. The flange of said casing surrounds the outer circumferences of the concave disk D and the outer flanged portion of the member F. Secured to the shaft B is a feeding-worm H, which is located in the box E, which is provided to feed the grain from the inlet end of the box to and between the two rubbing-surfaces of felt on the member F and the conical disk D. It is preferable that the shaft B have a slight longitudinal movement for the purpose of regulating the pressure between the felt or semisolid surface of the member F and the metallic convex surface of the disk D. This longitudinal movement is regulated by means of the angle-lever I, pivoted at I' to the frame, one end of said angle-lever being pivotally connected to the shaft B with provision for a slight play, while the free end of the lever is notched and carries a weight J.

Horizontally disposed and forming a part of the framework of the apparatus is a trough or box K, having a spout K' leading therein at one end, and in the end walls of said trough or box is journaled a work-shaft $K^2$, whereby the grain may be fed through said trough and into the trough $K^3$, leading from one end thereof. These troughs are steam-tight, and leading laterally from the trough $K^3$ is a suction-trough L, which leads to the fan-casing L' by way of the flue $L^2$.

On the lower shaft C is mounted a conical disk M, similar in construction to the disk D, with the exception of its inner face, which is provided with a series of brushes. (Clearly shown in the enlarged detail view, Fig. 6.) The shaft C has a worm C' for feeding the grain through the box $C^2$, which is similar to the box E before described. A concave member N is provided, which is secured to the flanges of the box $C^2$, and surrounding the inner circumferences of said disk M and the outer flange of member N is a circular casing N', which has leading therefrom a spout $N^2$. To the concaved surface of the member N is secured the semisolid material, preferably felt, $N^3$. Leading from the outlet end of the spout of the casing G is a flue or trough O, through which the grain passes from the outlet end of the casing G to and into the box $C^2$. The shaft C has pivotal connections with one end of an angle-lever P, which lever is pivoted at its angled portion, as at P', to the main frame, and the free end of the lever is notched and carries a weight $P^x$. This arrangement is to regulate the pressure between the contact-faces of the felt $N^3$ and the outer ends of the brushes.

Between the upper and lower shafts is mounted the shaft Q, on which the fan Q' is mounted. At one side of the frame is located a flue R, which has communicating therewith a flue R', Figs. 1 and 3, the inner end of said flue R' being connected to and communicating with the interior of the fan-casing. On either side of the flue R' is a suction-trough S, Fig. 3, one of said suction-troughs showing in Fig. 1, while the other trough communicates with the second set of bran separating or removing apparatus shown in outline in Fig. 2.

Leading into the trough or box K are the steam and water ports T and T', through which water or steam may be introduced into the trough accordingly as may be desired for the debranding of the various kinds of grain.

In Fig. 2 of the drawings is shown two series of similarly-constructed concaved and convex disks, as illustrated in Fig. 1 of the drawings, and mounted between each set of disks is an endless chain W, rotating over suitable pulleys and provided with buckets W', whereby the grain after having the outer scale or bran removed by passage through the first set of disks may be elevated and dumped into a feeding-trough X, which is similar to the trough K shown in Fig. 1 and in which the grain is treated in a similar manner as in the first set of dehulling apparatus for the removal of the second or inner scale of bran from the kernels of the grain.

In operation by our process the wheat or other grain from which it is desired to remove the bran is fed into the trough K, into which steam or water or both together are introduced, as the condition or kind of grain may require, to thoroughly saturate the first or outer scale of the bran. The grain is fed by the worm into the outlet-trough $K^3$, and in the passage of the grain through the spout K it is acted upon by a strong suction from the fan through the flue L for the purpose of removing all of the surplus moisture, which causes the saturated bran to expand or swell. This expanding of the bran releases itself from the second or inner layer of bran, which is afterward removed from the kernels. The grain being thus treated passes into the feed-box E, from which it is fed by the worm H to and between the adjacent faces of the conical disk D and the semisolid or felt surface which is mounted upon the concaved member F, and by a rotary contact of the disk D, which forces the grain against the felt, the outer covering of the bran will be broken by the rubbing action of the two surfaces and held away from the bodies of kernels. The grain passing from the outlet of the casing surrounding the conical disk and felt surface passes thence into the trough O, being acted upon as it enters said trough by means of a suction-current in the flue S, said current being provided to withdraw the bran from the grain. The grain being thus separated from the loose particles of bran passes through the trough O and into the box $C^2$, from which it is fed to and between the disk M, having a series of brushes upon its convex surface, and the semisolid surface of the member N. The grain after passing between the two surfaces (namely, brushes and soft felt) the remaining particles of bran are removed from the kernels of the grain by the rapid rotation of the conical member having the brushes upon its surface, and the grain passes through the chute or trough $N^2$, thence to the conveyers W, by which the grain is raised and deposited in a trough X. (Shown in Fig. 2 of the drawings.) The grain thus passing through the two sets of rotary disks for removing the outer surface is in readiness to be similarly treated by passing through a similarly-arranged apparatus, whereby the inner or second covering of bran may be removed from the grain to prepare the same for its reduction into the kind of produce desired. By means of the weighted members which are mounted on the angle-levers pivoted to the shafts it will be noted that the pressure of the conical surfaces of metal and brushes against the kernels held in contact with the semisolid or felt surface may be easily regulated.

From the foregoing it will be noted, that the grain is tempered by the use of water or steam, and the bran or woody matter which is of a fuzzy and feathery nature when ground with the whole grain, and causes fine particles of the glutinous matter composing the inner portions of the kernels to adhere to it, and which goes into a low grade of stock, by our machine is thoroughly removed, thus saving a large waste of flour of the finest quality, which by other mills goes into the lower grade of stock.

Having thus described our invention, what we claim to be new, and desire to secure by Letters Patent, is—

The herein-described process of treating cereals, which consists in moistening the grain to saturate the first scale, then subjecting it to an artificially-created current of air to remove the surplus moisture and expand the saturated portion, thus partially releasing it from the second bran-scale, then removing all particles of the outer bran-scale, then subjecting the kernels to a similar treatment to independently loosen and remove the inner bran-scale, and finally removing from the kernels all of the bran, substantially as described.

In testimony whereof we affix our signatures in presence of two witnesses.

WILLIARD W. LIND.
JOSEPH C. McKEE.

Witnesses:
H. A. GRIFFITHS,
WALTER GRIFFITHS.